United States Patent
Shirriff et al.

(10) Patent No.: US 10,110,686 B2
(45) Date of Patent: Oct. 23, 2018

(54) SYSTEMS AND METHODS FOR PROVIDING BEACON-BASED NOTIFICATIONS

(71) Applicant: Google Inc., Mountain View, CA (US)

(72) Inventors: Kenneth William Shirriff, Redwood City, CA (US); Prasad Haridass, Cupertino, CA (US); Damian Gajda, San Jose, CA (US); Matthew Joelson Secor, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/435,962

(22) Filed: Feb. 17, 2017

(65) Prior Publication Data

US 2017/0163748 A1 Jun. 8, 2017

Related U.S. Application Data

(63) Continuation of application No. 14/636,574, filed on Mar. 3, 2015, now Pat. No. 9,576,443.

(51) Int. Cl.
| | |
|---|---|
| *G08B 3/00* | (2006.01) |
| *G08B 5/00* | (2006.01) |
| *G08B 7/00* | (2006.01) |
| *H04L 29/08* | (2006.01) |
| *G08B 5/22* | (2006.01) |
| *G08B 21/18* | (2006.01) |
| *G06Q 10/10* | (2012.01) |

(52) U.S. Cl.
CPC ........... *H04L 67/18* (2013.01); *G06Q 10/109* (2013.01); *G08B 5/22* (2013.01); *G08B 21/182* (2013.01)

(58) Field of Classification Search
CPC ........ H04L 67/18; G06Q 10/109; G08B 5/22; G08B 21/182
See application file for complete search history.

(56) References Cited

U.S. PATENT DOCUMENTS

| | | | |
|---|---|---|---|
| 5,642,303 A | 6/1997 | Small et al. | |
| 7,003,283 B2 | 2/2006 | Hiltunen et al. | |
| 8,700,709 B2 | 4/2014 | Axelrod et al. | |
| 8,831,642 B2 | 9/2014 | Moldavsky et al. | |
| 8,990,556 B1* | 3/2015 | Wurster | H04W 12/08 713/158 |
| 2004/0042501 A1* | 3/2004 | Hester | H04W 52/0216 370/509 |
| 2007/0106931 A1 | 5/2007 | Vartiainen et al. | |
| 2007/0294304 A1 | 12/2007 | Bassett et al. | |

(Continued)

OTHER PUBLICATIONS

Unpublished Korean foreign priority document KR-10-2014-0159116 (Year: 2014).*

(Continued)

*Primary Examiner* — Erin M File
(74) *Attorney, Agent, or Firm* — Dority & Manning, P.A.

(57) ABSTRACT

Systems and method of providing beacon-based notifications are provided. More particularly, an identifying signal can be received from a beacon device. A geographic location of a user device can be determined based at least in part on the identifying signal. At least a portion of time-based contextual beacon data can then be obtained based at least in part on spatial-temporal data associated with a user. One or more notifications associated with the contextual beacon data can then be determined. The one or more notifications can indicative of information corresponding to the beacon device, and can be provided for display on a user device.

18 Claims, 8 Drawing Sheets

(56) References Cited

U.S. PATENT DOCUMENTS

| | | | |
|---|---|---|---|
| 2011/0099126 A1* | 4/2011 | Belani | G06Q 30/0284 |
| | | | 705/418 |
| 2011/0264656 A1* | 10/2011 | Dumais | G06F 17/3087 |
| | | | 707/728 |
| 2012/0042036 A1 | 2/2012 | Lau et al. | |
| 2014/0172988 A1* | 6/2014 | Baldwin | H04L 51/12 |
| | | | 709/206 |
| 2015/0257059 A1* | 9/2015 | Hirudayaraj | H04W 36/0083 |
| | | | 455/432.1 |
| 2016/0062590 A1* | 3/2016 | Karunamuni | G06F 3/0488 |
| | | | 715/863 |
| 2016/0239578 A1* | 8/2016 | Evans | G06F 17/30876 |
| 2017/0324578 A1* | 11/2017 | Kang | H04L 12/2814 |

OTHER PUBLICATIONS

Google Translation of KR-10-2014-0159116, Korean Patent Application, Samsung.. (Year: 2014).*

PCT International Search Report for PCT/US2016/020595, dated May 23, 2016—6 pages.

Dey et al., "CybreMinder: A Context-Aware System for Supporting Reminders," Proceedings of the $2^{nd}$ International Symposium on Handheld and Ubiquitous Computing, Bristol, United Kingdom, Sep. 25-27, 2000, pp. 172-186.

Mamasse et al., "Location-Aware Information Delivery with ComMotion," Proceedings of the $2^{nd}$ International Symposium on Handheld and Ubiquitous Computing, Bristol, United Kingdom, Sep. 27-27, 2000, pp. 157-171.

* cited by examiner

|  | MONDAY, JANUARY 19, 2015 | TUESDAY, JANUARY 20, 2015 | WEDNESDAY, JANUARY 21, 2015 | THURSDAY, JANUARY 22, 2015 | FRIDAY, JANUARY 23, 2015 | SATURDAY, JANUARY 24, 2015 |
|---|---|---|---|---|---|---|
| 8:00:00 AM |  |  |  |  |  |  |
| 9:00:00 AM |  |  |  |  |  |  |
| 10:00:00 AM |  |  |  |  |  |  |
| 11:00:00 AM | LUNCH | LUNCH | LUNCH | LUNCH | LUNCH |  |
| 12:00:00 PM | LUNCH | LUNCH | LUNCH | LUNCH TEAM 2 MEETING | LUNCH |  |
| 1:00:00 PM |  |  |  |  |  |  |
| 2:00:00 PM |  | TEAM 1 MEETING, TEAM 2 MEETING |  |  | TEAM 3 MEETING |  |
| 3:00:00 PM |  |  |  |  |  |  |
| 4:00:00 PM |  |  |  |  | SOCIAL EVENT |  |
| 5:00:00 PM |  |  |  |  |  |  |
| 6:00:00 PM |  |  |  |  |  |  |
| 7:00:00 PM |  |  |  |  |  |  |

*FIG. 4*

|  | MONDAY, JANUARY 19, 2015 | TUESDAY, JANUARY 20, 2015 | WEDNESDAY, JANUARY 21, 2015 | THURSDAY, JANUARY 22, 2015 | FRIDAY, JANUARY 23, 2015 | SATURDAY, JANUARY 24, 2015 |
|---|---|---|---|---|---|---|
| 8:00:00 AM |  |  |  |  |  |  |
| 9:00:00 AM |  |  |  |  |  |  |
| 10:00:00 AM | DOCTOR'S APPOINTMENT |  |  |  |  |  |
| 11:00:00 AM |  |  |  |  |  |  |
| 12:00:00 PM |  | LUNCH WITH BOB |  | MEETING IN CAFETERIA |  |  |
| 1:00:00 PM |  |  |  |  |  |  |
| 2:00:00 PM |  | MEETING IN CAFETERIA |  |  | MEETING IN CONFERENCE ROOM A |  |
| 3:00:00 PM |  |  |  |  |  |  |
| 4:00:00 PM |  |  |  |  |  |  |
| 5:00:00 PM |  |  |  |  |  |  |
| 6:00:00 PM |  |  | DINNER AT JOHN'S STEAKHOUSE |  |  |  |
| 7:00:00 PM |  |  |  |  | CONCERT AT ARENA |  |

SYSTEMS AND METHODS FOR PROVIDING BEACON-BASED NOTIFICATIONS

PRIORITY CLAIM

The present application is a continuation of U.S. application Ser. No. 14/636,574 having a filing date of Mar. 3, 2015. Applicant claims priority to and benefit of all such applications and incorporate all such applications herein by reference.

FIELD

The present disclosure relates generally to beacon devices and more particularly to providing notifications associated with one or more beacon devices to a user.

BACKGROUND

In recent years, location based functionality associated with mobile computing devices has become increasingly popular. Location based functionality can allow a user device, such as a smart phone, tablet or wearable computing device, to receive information and to perform actions associated with the information. Such location based functionality can be implemented, for instance, through the use of beacon devices. Beacon devices are a recent technology that can be used, for instance, in determining proximity and location. A beacon device is a small, low cost, self-contained device that can periodically provide (e.g. broadcast using a short range wireless communication technology) information. A user device can receive the information and use the knowledge of the identity of the beacon device and proximity to the beacon device for various purposes, including determining location, communication, asset tracking, retail identification, safety, etc.

SUMMARY

Aspects and advantages of embodiments of the present disclosure will be set forth in part in the following description, or may be learned from the description, or may be learned through practice of the embodiments.

One example aspect of the present disclosure is directed to a computer implemented method of providing notifications to a user. The method includes detecting, by one or more computing devices, a beacon device. The method further includes obtaining, by the one or more computing devices, at least a portion of time-based contextual data associated with the beacon device. The at least a portion of time-based contextual data is identified based at least in part on spatial-temporal data associated with a user. The method further includes determining, by the one or more computing devices, one or more notifications based at least in part on the time-based contextual data. The method further includes providing for display, by the one or more computing devices, at least one of the one or more notifications.

Other aspects of the present disclosure are directed to systems, apparatus, tangible, non-transitory computer-readable media, user interfaces and devices for scanning for beacon devices.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Reference will now be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus it is intended that aspects of the present disclosure cover such modifications and variations.

Overview

Example aspects of the present disclosure are directed to providing notifications associated with a beacon device. A beacon device can be a communication device having a known location that periodically broadcasts (e.g. using short range wireless communication technology) information identifying the beacon device. A beacon device can be, for instance, a radio frequency (RF) beacon device (e.g. a Bluetooth™ Low Energy (BLE) beacon device), an infrared beacon device, or a radio frequency identification (RFID) tag.

One or more user devices (e.g. smartphone, tablet, wearable computing device, or any other suitable computing device capable of being carried by a user while in operation) can scan for and receive information from beacon devices. In particular, a user device can receive the information identifying the beacon device (e.g. universally unique ID, a URL, a sequence of bytes, an encrypted identifier, etc.) and can use this information to ascertain other information associated with the beacon device. This other information can be obtained, for instance, from a server that uses the beacon identification to access the information. This information provided by the server can also be customized based on user information such as settings, search history, location history or other user information. The information provided by the server can include, for instance, location information (e.g. latitude, longitude coordinates) that the user device can use to determine proximity to the beacon device, and thus to a corresponding geographic location. This can be used, for instance, for navigation purposes. The beacon device can also be used to provide information, for instance, in the form of a notification or an application associated with the beacon device.

Such information can be updated over time. For instance, a user who visits a particular café may be provided a menu for the café on a user device associated with the user. The provided menu may vary, for instance, based on whether the café is currently serving breakfast, lunch or dinner, or based on the specials for a particular day. Additionally, the relevance of the provided information can vary according to the desires of a user. For instance, a user who enters a conference room for a meeting may wish to view information associated with the meeting, but a user who enters the conference room for another purpose may not wish to view the information associated with the meeting. Typically, information associated with a beacon device is managed and updated manually, which can be inefficient and inconvenient.

In some embodiments, in order to obtain the benefits of the techniques described herein, the user may be required to allow the collection and analysis of location information associated with the user or the user device. Therefore, in some embodiments, users may be provided with an opportunity to control settings associated with whether programs or features collect such information. If the user does not allow collection and use of such signals, then the user may not receive the benefits of the techniques described herein. For instance, changes to these settings can cause scanning for one or more beacon devices to be enabled or disabled. The user can also be provided with tools to revoke or modify consent. In addition, in some embodiments, certain information or data can be treated in one or more ways before it is stored or used, so that personally identifiable information is removed.

According to example aspects of the present disclosure, contextual data associated with a beacon device and spatial-temporal data associated with a user can be analyzed to determine information that is relevant to the user. In particular, an identifying signal from one or more beacon devices can be received by a user device and used to determine time-based contextual data associated with the beacon device. Such contextual beacon data can be stored, for instance, in a remote computing device such as a server or database. In particular, the contextual beacon data can be derived from a calendar associated with the beacon device having different data associated with different dates and times.

In example aspects of the present disclosure, the time-based contextual data can be determined based on spatial-temporal data associated with the user. This spatial-temporal data may be stored in a memory of the user device, or may be stored in a remote computing device such as a database or server. The spatial-temporal data can include the user's location determined, for instance, from the identifying signal from the beacon device. In alternative embodiments, the user's location can be determined at least in part by a positioning system associated with the user device (e.g. GPS or other positioning system), and/or a network based (e.g. WiFi, cellular network, etc.) location determination.

The spatial-temporal data can further include, for instance, time-based data associated with the user. The time-based data can include the date and time at which the beacon device is detected (e.g. the current time), or some other time, such as a user-specified time. In example embodiments, the time-based data can include the user's scheduled tasks or events and can be organized, for instance, in a calendar. For instance, in continuing the above example regarding the conference room, the spatial-temporal data can indicate that the user has a meeting scheduled in the conference room at a particular time on a particular date.

Contextual beacon data can include, for instance, calendar data associated with the beacon device that corresponds to the time and location indicated in the spatial-temporal data. In example embodiments, contextual beacon data can further include beacon calendar data that corresponds to the calendar data indicated in the spatial-temporal data. In particular, if a concurrence can be found between the beacon calendar data and the user calendar data, contextual beacon data associated with the concurrence can be determined to be relevant to a user. A concurrence can be found, for instance, if the beacon calendar data and the user calendar data are indicative of the same event or occurrence at a particular time. For instance, if the calendar data for the beacon device associated with the conference room indicates that there is a meeting currently being held in the conference room and the calendar data for the user indicates that the user has a currently scheduled meeting in the conference room, a concurrence can be found. Accordingly, the relevant contextual beacon data can be indicative of the meeting.

In example embodiments, the relevant contextual beacon data can include all of the contextual beacon data for the time indicated in the spatial-temporal data, or a subset of the contextual beacon data for that time. The subset can include only the contextual beacon data that is determined to be relevant to the user. For example, if the contextual beacon data indicates that there are two meetings simultaneously scheduled for the conference room, the spatial-temporal data can be analyzed to determine which meeting the user is scheduled to attend. The relevant contextual beacon data (e.g. the subset) can then be indicative only of the correct meeting.

Once the contextual beacon data is determined, one or more notifications can be determined. A notification can be associated with the contextual beacon data. In example embodiments, the notifications can be determined for all of the contextual beacon data or only for relevant contextual beacon data. A notification can be indicative of information corresponding to the contextual beacon data. For instance, if the contextual beacon data indicates a meeting scheduled in a conference room, the corresponding information can include an agenda for the meeting, a list of attendees, etc. The notifications can then be provided for display by the user device. The notification can be displayed, for instance, as an icon in a notification bar, as a pop-up notification, and/or in any other suitable manner. The notification can include a link to the corresponding information. Upon user interaction with the notification, the user device can display the information, for instance, as a web page, as HTML presented in a webview, as an external application, or as part of the user device's operating system.

In alternative embodiments, a notification can be indicative of other information determined to be relevant to a user. For instance, a notification can include a link to travel directions to a destination determined to be relevant to the user. For instance, in continuing the conference room example from above, if the spatial-temporal data for the user indicates that the user does not have a currently scheduled (or upcoming) meeting in the conference room (e.g., if no concurrence can be determined between the beacon and user calendars), a notification can include information indicating that the user is in the wrong location. In an example embodiment, if the spatial-temporal data indicates that the user has a currently scheduled meeting in a different conference room, the notification can include a link to travel directions to the correct conference room. Such travel directions can include interior directions within a building, and/or exterior directions to another building or location.

In example embodiments, the user device or other suitable device can prioritize and rank the determined notifications and provide for display a subset of the ranked notifications that are above a priority threshold. In particular, the ranking can include a determination of which information is most relevant to a user. The ranking can be based on factors such as the user's location relative to one or more beacon devices, the user's prior interactions with notifications, the user's search history, other users' interactions with similar notifications, machine learning techniques (e.g. spam recognition), the user's location history, etc. Once the notifications have been prioritized and ranked, the user device can provide for display one or more of the notifications that are above the priority threshold (e.g., the top three most relevant instances of user specific beacon information).

In further example embodiments, duplicate notifications can be filtered such that the user device only displays one notification associated with a particular instance of information. For example, if multiple notifications are determined that are associated with the same or similar information, the user device can filter and remove all but one of the notifications such that the user device only displays one notification associated with the information. In still further example embodiments, stale notifications can be removed from display. Stale notifications can include notifications associated with information that is no longer relevant to a user. For instance, in continuing the above example, if the user leaves the conference room, or if the meeting concludes, the notification associated with the meeting is no longer relevant to the user, and can be removed from display on the user device.

Example Beacon Device Systems

Figure 1:
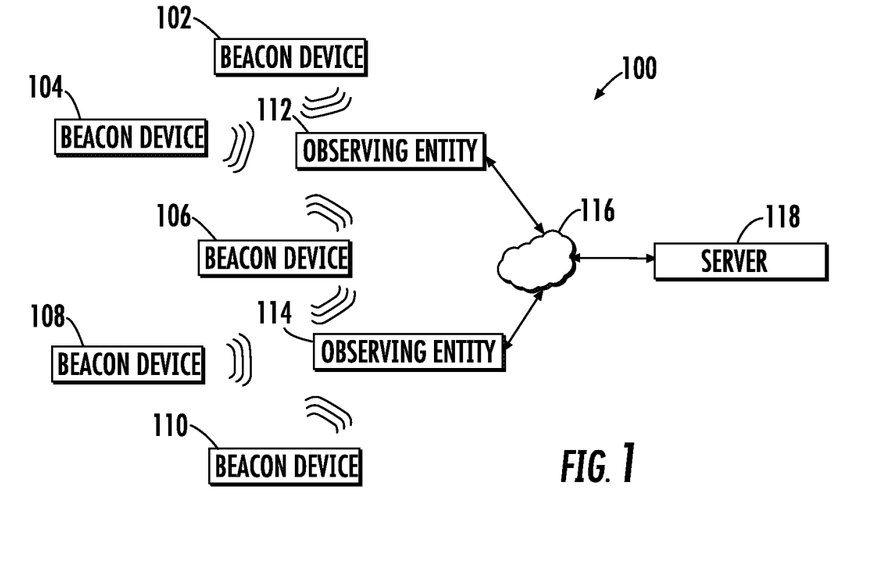
FIG. 1 depicts an example beacon device system according to example embodiments of the present disclosure.

FIG. 1 depicts an example system 100 according to example embodiments of the present disclosure. System 100 can include a plurality of beacon devices 102-110, one or more observing entities 112 and 114, and at least one server 118. Beacon devices 102-110 can be used for many different applications, including, for example, co-presence (e.g. two entities becoming aware of each other), location-based gaming, asset tracking, beacon device localization or observing entity localization, telemetry, information provisioning (e.g. use of an observing entity to obtain various information such as semantic information or geographic information associated with beacon devices 102-110 as the observing entity moves about the world), intra-beacon communication, payment systems, etc. Other applications can include providing information associated with a business, such as a menu for a restaurant, providing information associated with a music festival, providing information associated with a transit schedule, etc. The present disclosure provides a general system that can be applicable to the above noted applications or other applications as well.

Beacon devices 102-110 can be computing devices that are configured to emit messages. For example, the messages can include data that is broadcast by the beacon devices 102-110. In example embodiments, the data can be used for the purpose of being "noticed" without requiring a two-way connection. Thus, in such embodiments, the entirety of the interaction between the beacon devices 102-110 and the observing entities 112 and 114 can be performed without requiring a connection between the observing entity and the beacon device or a connection between the beacon device and the server. Instead, all relevant information for the interaction is contained within the data emitted by the beacon device. Limiting beacon device interaction to the broadcasting of data can provide a nominal behavior that allows energy consumption and service life to be modeled and reasonably predicted. In alternative embodiments, beacon devices 102-110 can include computing devices that use two-way communication. For instance, a BLE beacon device using active scanning can implement two-way communication.

As an example, the beacon devices 102-110 can broadcast the data using short range wireless communication technologies such as, for example, Bluetooth, Bluetooth low energy, ZigBee, Near Field Communication, WiFi Direct, or other technologies. Furthermore, although short range wireless communication technologies are provided as an example, any communication method can be used to transmit data from the beacon devices 102-110 to the observing entities 112 and 114, including, for example, wired connections, general radio frequency communication, optical communication, infrared communication, magnetic communication, or other communication methods.

In embodiments in which beacon devices employ Bluetooth low energy (BLE) technology for broadcasting, each message can carry a 31-byte payload. As noted, messages can be broadcast events that are capable of being received and processed by any listening device (e.g. user device). Further, the above example implementation using BLE technology is provided as an example only. Other suitable communication protocols having different frame formats or channel assignments can be used, as well. In addition, as certain protocols are modified or replaced over time, the present disclosure can be easily adapted for implementation using such new protocols.

Server 118 can include one or more computing devices configured to communicate with observing entities 112 and 114 over a network 116. As an example, server 118 can be one or more server computing devices. In the instance that a plurality of server computing devices are used, the server computing devices can be arranged according to any suitable computing architecture, including sequential computing architectures, parallel computing architectures, or combinations thereof. Observing entities 112 and 114 can be user devices (e.g. smartphones, tablets, wearable computing devices, or any other suitable mobile computing device capable of being carried by a user while in operation), such as user device 122 depicted in FIG. 2.

Network 116 can be any type of communications network, such as a local area network (e.g., intranet), wide area network (e.g., Internet), or some combination thereof and can include any number of wired or wireless links. In general, communication between the server 118 and observing entities 112 and 114 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

Furthermore, although each observing entity 112 and 114 is shown as communicating directly with the server 118 over network 116, there may be any number of intervening devices between the observing entity 112 or 114 and the server 118. As an example, in some embodiments, groups of observing entities can be organized in a network (e.g. a mesh network) and can relay messages back and forth from a particular observing entity to the server 118.

Figure 2:
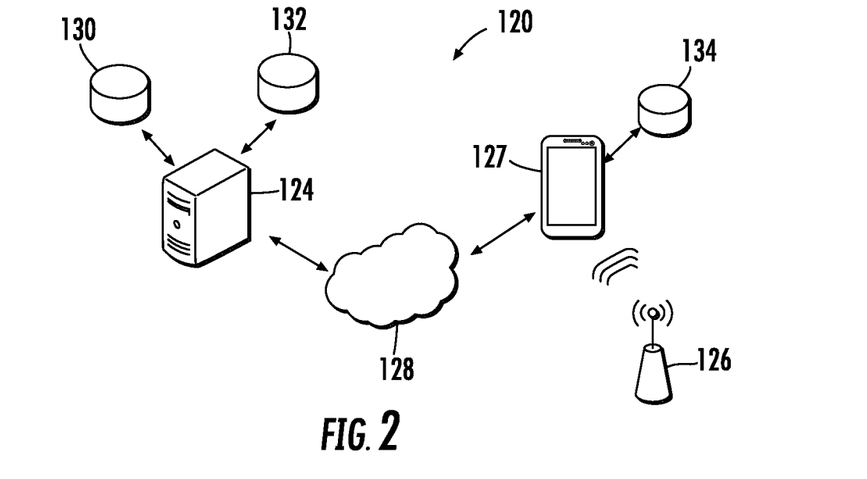
FIG. 2 depicts an example beacon device system according to example embodiments of the present disclosure.

FIG. 2 depicts an example beacon device system 120 according to example embodiments of the present disclosure. System 120 can be a particular implementation of system 100 and can include a user device 122, a server 124, and a beacon device 126. User device 122 can communicate with server 124 over a network 128. Network 128 can be any suitable type of communications network such as network 116 in FIG. 1. According to example embodiments of the present disclosure, beacon device 126 can provide (e.g. broadcast using a short range wireless communication technology) an identifying signal to user device 122. Upon receiving the identifying signal, user device 122 can determine a geographic location of beacon device 126, and in turn, a geographic location of user device 122. For instance, user device 122 can communicate with server 124 to determine the geographic location of beacon device 126. User device 122 can further communicate with server 124 to determine other information associated with beacon device 126.

Server 124 can correspond to server 118 in FIG. 1 and can include one or more databases such as beacon location database 130 and beacon information database 132. Beacon location database 130 can include data indicative of a geographic location of one or more beacon devices. Beacon information database 132 can include data associated with one or more beacon devices, such as beacon device 126. In example embodiments, beacon information database 132 can include data associated with the location of beacon device 126, such as a restaurant or a business. For instance, if beacon device 126 is located in a café, beacon information database 132 can include information associated with the café, such as a menu or an advertisement for the café and/or discount coupons or special offers associated with the café. In example embodiments, beacon information database 132 can organize the information by date and time, for instance with a calendar. In particular, beacon information database 132 can include a calendar having different information associated with different dates and times. For instance, the calendar can associate a breakfast menu with the times of the day that the café serves breakfast, and a lunch menu with the times of the day that the café serves lunch. Further, the calendar can associate different menus with different dates, depending, for instance, on the daily or weekly specials, or other various changes to the menu.

As another example, a beacon device (e.g. beacon device 126) can be located at a particular stage during a music festival. In such example, beacon information database 132 can include information associated with the different musical acts that play on the stage throughout the festival. In particular, beacon information database 132 can include information associated with the various musical acts and can associate the information with the respective times at which the musical acts play on the stage. For instance, such information can include a biography of the musical act, a set list, upcoming tour dates, a link to the musical act's website, advertisements, discount coupons for music or merchandise, etc.

Referring still to FIG. 2, user device 122 can include user information database 134. User information database 134 can include information associated with a user of user device 122. For instance, user information database 134 can include information organized by time and date, such as with a calendar. In particular, the calendar can include the user's upcoming scheduled tasks and/or events, such as for instance, upcoming meetings, dinner reservations, or assignments. Such calendar data can be organized according to the date and time at which they are to occur. User information database 134 can further include a determined geographic location of user device 122. As described above, the geographic location can be determined based on the beacon device location, and/or other suitable positioning techniques (e.g., GPS or network based techniques).

Example Methods of Providing Beacon-Based Notifications

Figure 3:
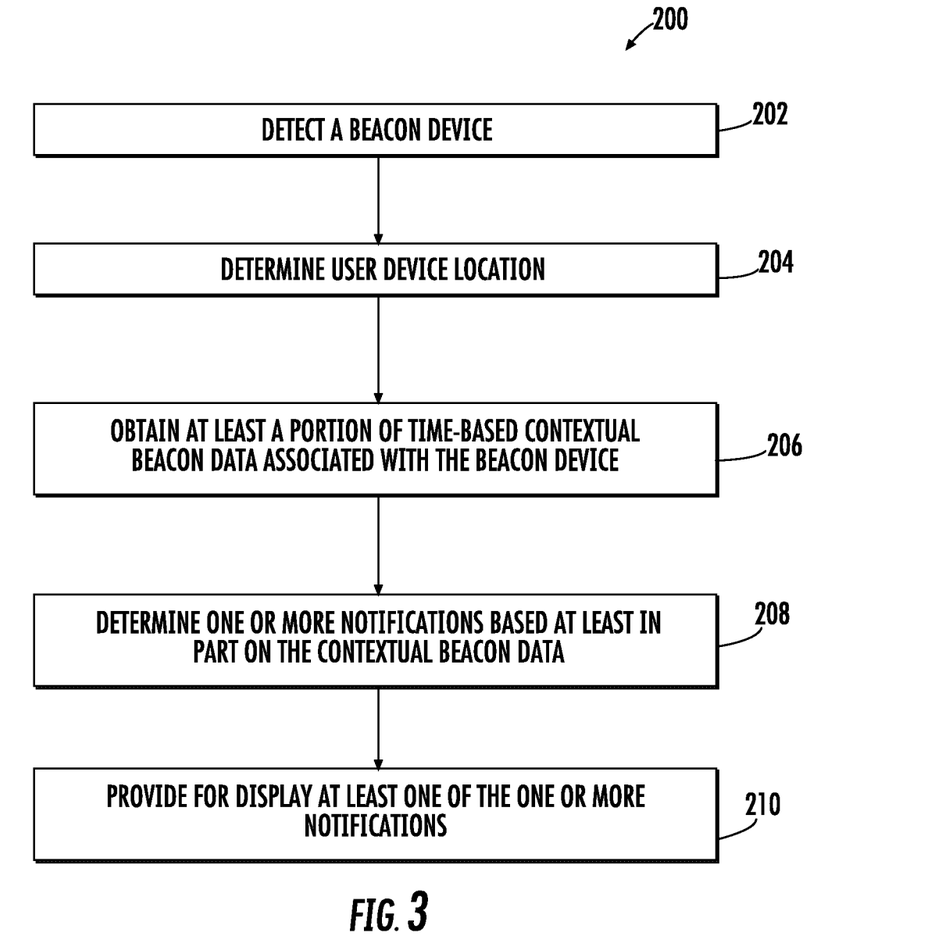
FIG. 3 depicts a flow diagram of an example method of providing notifications according to example embodiments of the present disclosure.

FIG. 3 depicts a flow diagram of an example method (200) of providing beacon-based notifications according to example embodiments of the present disclosure. It will be appreciated that method (200) can be implemented by one or more computing devices, such as one or more of the computing devices depicted in FIG. 1. In addition, FIG. 3 depicts steps performed in a particular order for purposes of illustration and discussion. Those of ordinary skill in the art, using the disclosures provided herein, will understand that the various steps of any of the methods disclosed herein can be omitted, adapted, modified, rearranged, or expanded in various ways without deviating from the scope of the present disclosure.

At (202), method (200) can include detecting a beacon device. In particular, detecting the beacon device can include receiving an identifying signal from the beacon device. For instance, the signal can include a universally unique ID, a URL, a sequence of bytes, an encrypted identifier, etc. At (204), method (200) can include determining a geographic location of the user device. The geographic location can be determined, for instance, based at least in part on the identifying signal from the beacon device. In particular, upon receiving an identifying signal from a beacon device, the geographic location of the beacon device can be determined, for instance, through communication with a beacon location database, such as beacon location database 130. A corresponding location of the user device can then be determined based at least in part on the location of the beacon device.

At (206), method (200) can include obtaining at least a portion of contextual beacon data associated with the beacon device. As indicated above, contextual beacon data can include time-based data (e.g. calendar data) associated with a beacon device, and can be determined based at least in part on spatial-temporal data associated with the user. In particular, a beacon device can have various associated time-based data. Such data can be organized as a calendar having different data for different dates and times. For instance, a beacon device associated with a particular café can have associated data relating to the café. The data can be organized according to date and time (e.g. breakfast is served from 8:00 AM to 11:00 AM, and lunch is served from 11:00 AM to 2:00 PM).

Figure 4:
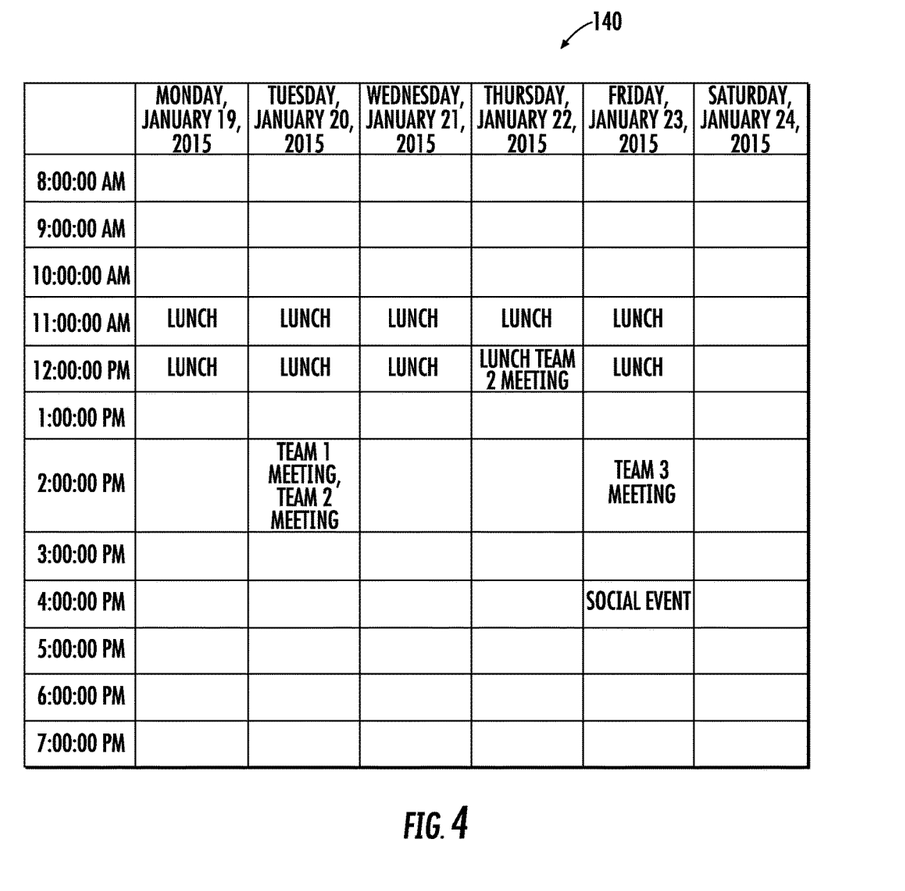
FIG. 4 depicts a diagram of example calendar data associated with a beacon device according to example embodiments of the present disclosure.

FIG. 4 depicts a diagram of example calendar data 140 according to example embodiments of the present disclosure. Calendar data 140 can be calendar data associated with a particular beacon device, and can be stored, for instance, in beacon information database 132 of FIG. 2. Calendar data 140 can include data associated with the location of a beacon device. For instance, calendar data 140 includes a schedule of events for a cafeteria on an office campus. As shown, the calendar data corresponding to 11:30 AM on Thursday, Jan. 22, 2015 indicates that lunch will be served in the cafeteria at that time. Further, the calendar data corresponding to 12:00 PM on January 22 indicates that lunch will be served at that time and that a Team 2 meeting has been scheduled in the cafeteria for that time.

Figure 5:
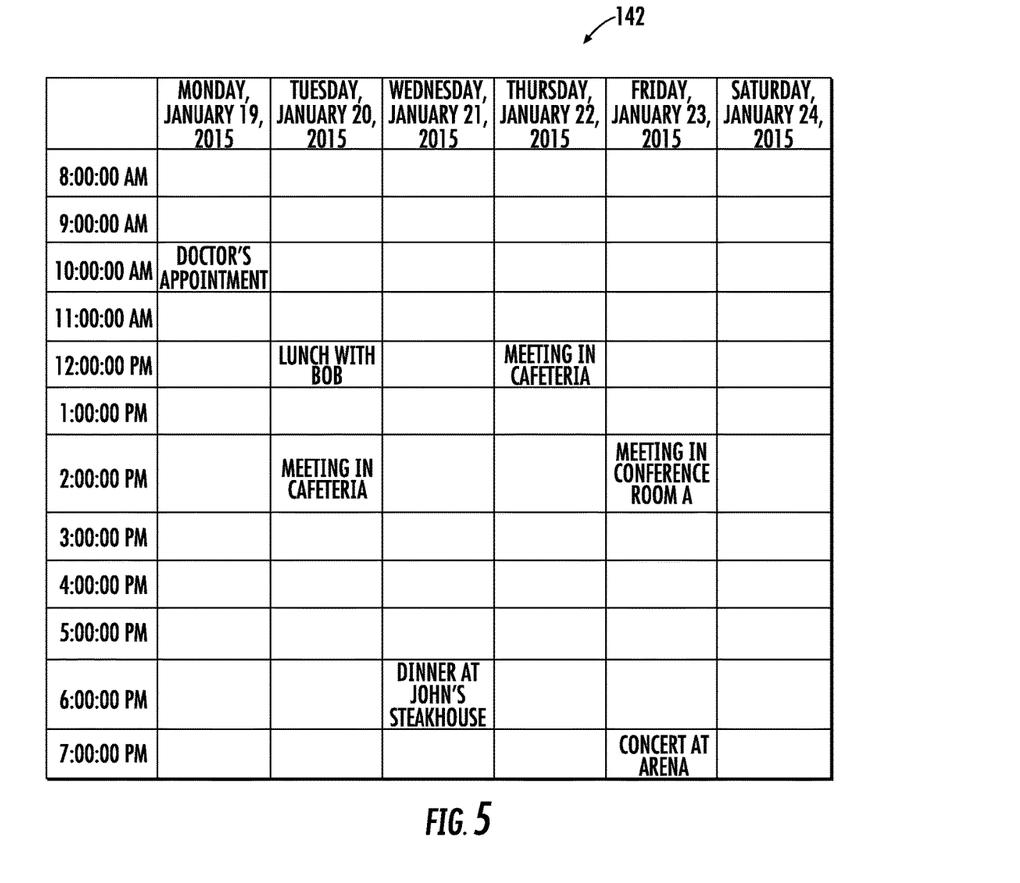
FIG. 5 depicts a diagram of example calendar data associated with a user according to example embodiments of the present disclosure.

In example embodiments, the contextual beacon data can be determined based at least in part on spatial-temporal data associated with a user. Spatial-temporal data can include a current location of a user and a time (e.g. a current time or a user-specified time). Spatial-temporal data can further include data indicative of the user's upcoming scheduled tasks or events (e.g. calendar data). For instance, FIG. 5 depicts a diagram of example calendar data 142 associated with a user. Calendar data 142 can be stored, for instance, in user information database 134. It will be appreciated that calendar data 142 can be stored in other suitable locations such as in a database associated with a remote computing device (e.g. server 124). Calendar data 142 can include the user's upcoming scheduled tasks and/or events. For instance, at 12:00 PM on Thursday, Jan. 22, 2015, calendar data 142 indicates that the user has a meeting scheduled in the cafeteria.

Calendar data 140 can be analyzed in view of the spatial-temporal data to determine contextual beacon data. In particular, the contextual beacon data can include the beacon calendar data that corresponds to the time and location indicated in the spatial-temporal data. For instance, if a user enters the cafeteria (and the user device detects a beacon device associated with the cafeteria) at 11:00 AM on Jan. 22, 2015, the calendar data for that time can indicate that lunch is being served in the cafeteria. Accordingly, the contextual beacon data can be associated with the lunch.

In embodiments in which the spatial-temporal data further includes calendar data associated with the user (e.g. calendar data 142), at least a portion of the contextual beacon data can be determined to be relevant to the user. Such determination can be made, for instance, if a concurrence can be determined between the beacon calendar data 140 and the user calendar data 142. For instance, if the user enters the cafeteria at 12:00 PM on January 22 (or, for instance, several minutes beforehand), the calendar data can indicate that lunch is served in the cafeteria and that Team 2 has a scheduled meeting in the cafeteria at 12:00. Additionally, the spatial-temporal data can further indicate that the user has a meeting scheduled for the cafeteria at 12:00. Based on the calendar data and the spatial-temporal data it can be determined that the user is in the cafeteria for the Team 2 meeting. Accordingly, the contextual beacon data associated with the meeting can be determined to be relevant to the user.

In example embodiments, the relevant contextual beacon data can include all of the contextual beacon data for the indicated time or the relevant contextual beacon data can include only a subset of the contextual beacon data. For instance, if the contextual beacon data indicates that there are multiple meetings simultaneously scheduled for a conference room and the spatial-temporal data indicates that the user has a meeting scheduled for the conference room, the contextual beacon data and the spatial-temporal data can be analyzed to determine a concurrence, and to determine which meeting the user is scheduled to attend. Upon this determination, the relevant contextual beacon data can be indicative of the correct meeting, and not the other meetings.

In some embodiments, it can be determined that no contextual beacon data is relevant to the user. For instance, if the user enters the cafeteria at 2:00 PM on Friday, Jan. 23, 2015, the contextual beacon data can indicate that Team 3 has a currently scheduled meeting in the cafeteria. However, the spatial-temporal data can indicate that the user has a meeting currently scheduled in Conference Room A. Accordingly, it can be determined that the user is in the wrong location. As will be described further below, a notification can then be provided to the user indicating that the user is in the wrong location. In example embodiments, the notification can provide a link to travel directions from the user's present location (e.g. the cafeteria) to the correct location (e.g. Conference Room A).

Referring back to FIG. 3 at (208), method (200) can include determining one or more notifications based at least in part on the contextual beacon data. As described above, a notification can be indicative of information corresponding to contextual beacon data. For instance, if contextual beacon data associated with a café indicates that lunch is currently being served, the corresponding information can include a lunch menu. As another example, if contextual beacon data associated with a particular stage at a music festival indicates that a musical act is currently playing on the stage, the corresponding information can include information relating to the band, such as a band biography, a set list, etc.

In example embodiments, notifications may be determined only for relevant contextual beacon data. For instance, in the scenario where multiple meetings are simultaneously scheduled for a conference room, notifications may only be determined for the meeting that the user is scheduled to attend.

In alternative embodiments, a notification can be associated with other information determined to be relevant to a user, such as travel directions. For instance, if a user device detects a beacon device located at a subway station, and the spatial-temporal data indicates that the user has an event scheduled within the next hour, a notification can be determined that includes a link to travel directions from the user's current location to the location of the event. The travel directions can include subway routes and/or routes associated with other forms of transportation.

Figure 6:
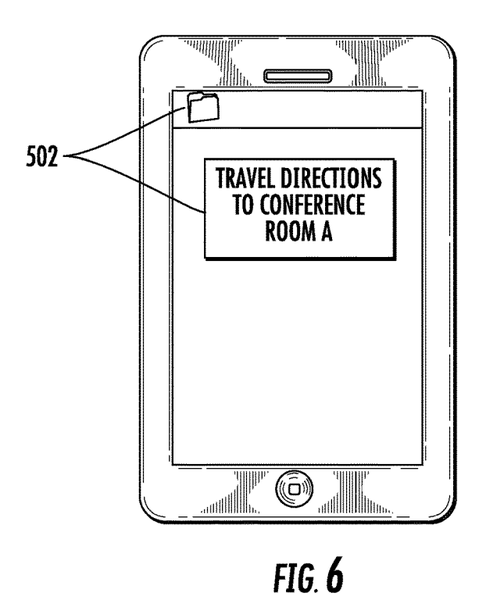
FIG. 6 depicts an example notification according to example embodiments of the present disclosure.

Once the notifications have been determined, at least one of the notifications can be provided for display on the user device (210). For instance, FIG. 6 depicts an example notification 502 provided for display on a user device according to example embodiments of the present disclosure. In particular, notification 502 can be displayed in a notification bar at the top of the screen, in a pop-up notification with text, and/or in any other suitable manner. Notification 502 can be associated with the contextual beacon data. Notification 502 can provide a visual and/or audible indication to a user of further information associated with a beacon device. A notification can further provide an indication to a user by causing a user device to vibrate. For instance, notification 502 can include a link to travel directions from the user's current location to the location of the event. Upon a user interaction with the link, the travel directions can be provided for display.

Figure 7:
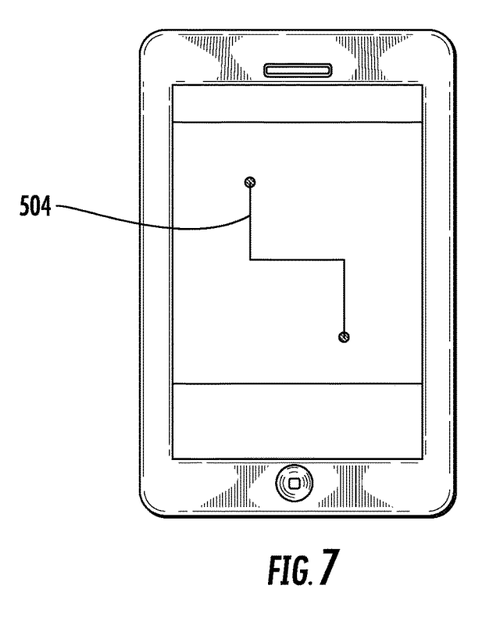
FIG. 7 depicts example travel directions according to example embodiments of the present disclosure.

For instance, FIG. 7 depicts example travel directions 504 according to example embodiments of the present disclosure. Travel directions 504 can include directions from a current location of a user to a desired location. Travel directions 504 can include subway routes and/or routes associated with other forms of transportation. In example embodiments, travel directions 504 can further include directions within the interior of a building and/or external directions outside of a building.

Figure 8:
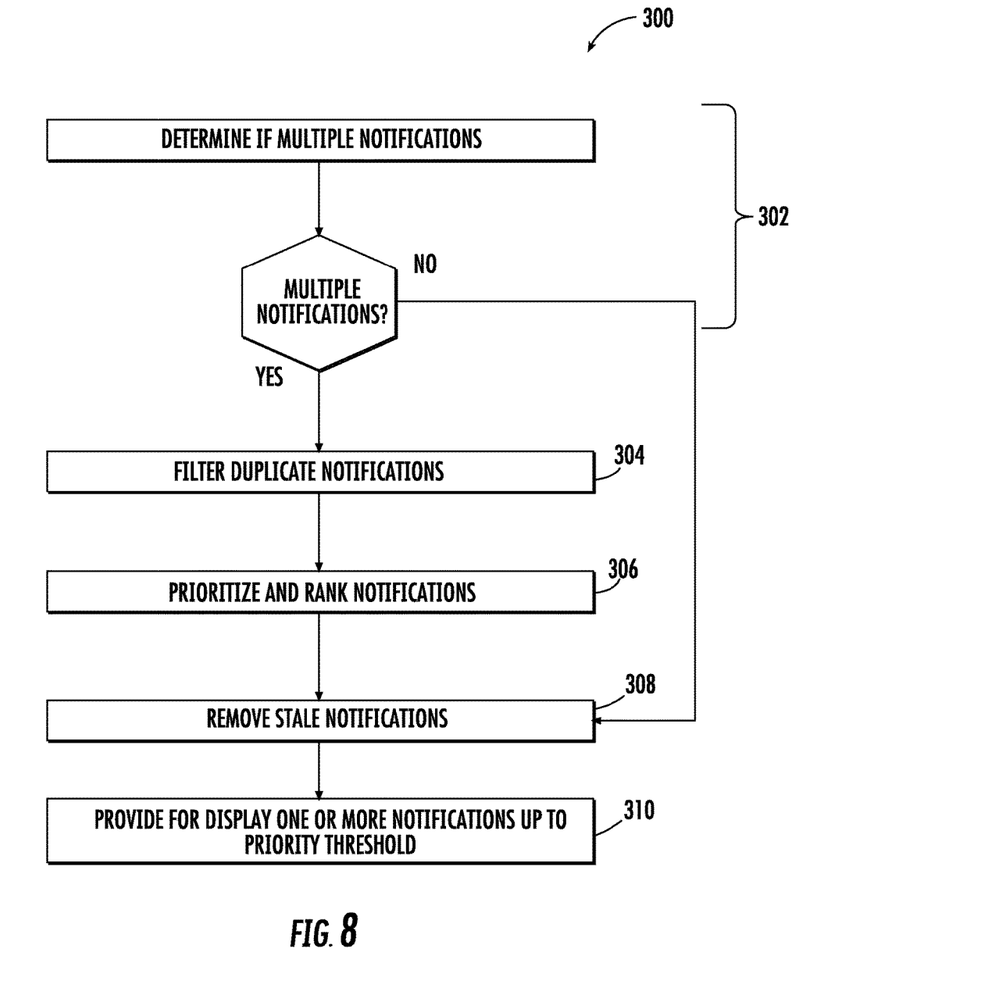
FIG. 8 depicts a flow diagram of an example method of providing notifications according to example embodiments of the present disclosure.

FIG. 8 depicts a flow diagram of an example method (300) of providing one or more notifications according to example embodiments of the present disclosure. At (302), method (300) can include determining whether multiple notifications have been generated. If only one notification has been generated, (304) and (306) can be bypassed and method (300) can proceed to (308), which will be described in more detail below. If more than one notification has been generated, at (304), method (300) can include filtering duplicate notifications. A duplicate notification can be a notification associated with the same or similar information as another notification. For instance, if more than one notification is indicative of the same information, all but one of these notifications can be filtered such that they are not provided for display by the user device. Duplicate notifications can occur, for instance, if multiple beacon devices are simultaneously detected, each having the same or similar information. As another example, duplicate notifications can occur if one beacon device has multiple instances of the same or similar information.

Once the duplicate notifications are filtered, method (300) can include prioritizing and ranking the notifications (306). In particular, the notifications can be ranked according to a determination of relevance to the user. The determination can be based at least in part on a user's location (e.g., how close a user is to a specific location), the user's past behavior regarding notifications (e.g., if the user regularly ignores notifications of this type), the user's search history, other users' behavior with similar notifications, machine-learning techniques (e.g., spam recognition), the user's location history (e.g., how often the user travels to a location), etc. The notification determined to be most relevant to the user can be ranked first, the next most relevant notification can be ranked second, and so on. In alternative embodiments, notifications can be ranked based at least in part on merchant payments and/or advertisement auctions wherein advertisers can bid on advertisement locations.

At (308), method (300) can include removing stale notifications from display. Stale notifications can include notifications that are no longer relevant to a user. For instance, if a user leaves a location associated with a beacon device, the notification may no longer be relevant. As another example, if the time period of an event at the location of the beacon device has expired, the notification may no longer be relevant. Such stale notifications can be removed from display by the user device.

Once the stale notifications are removed from display, method (300) can include providing for display one or more notifications (310). In example embodiments, an amount of notifications can be provided for display up to a predetermined priority threshold. The priority threshold can be indicative of the maximum number of notifications to be simultaneously provided for display. For instance, if the priority threshold is three, and there are more than three notifications, the three most relevant notifications can be provided for display (e.g., the notifications ranked first, second, and third).

Figure 9:
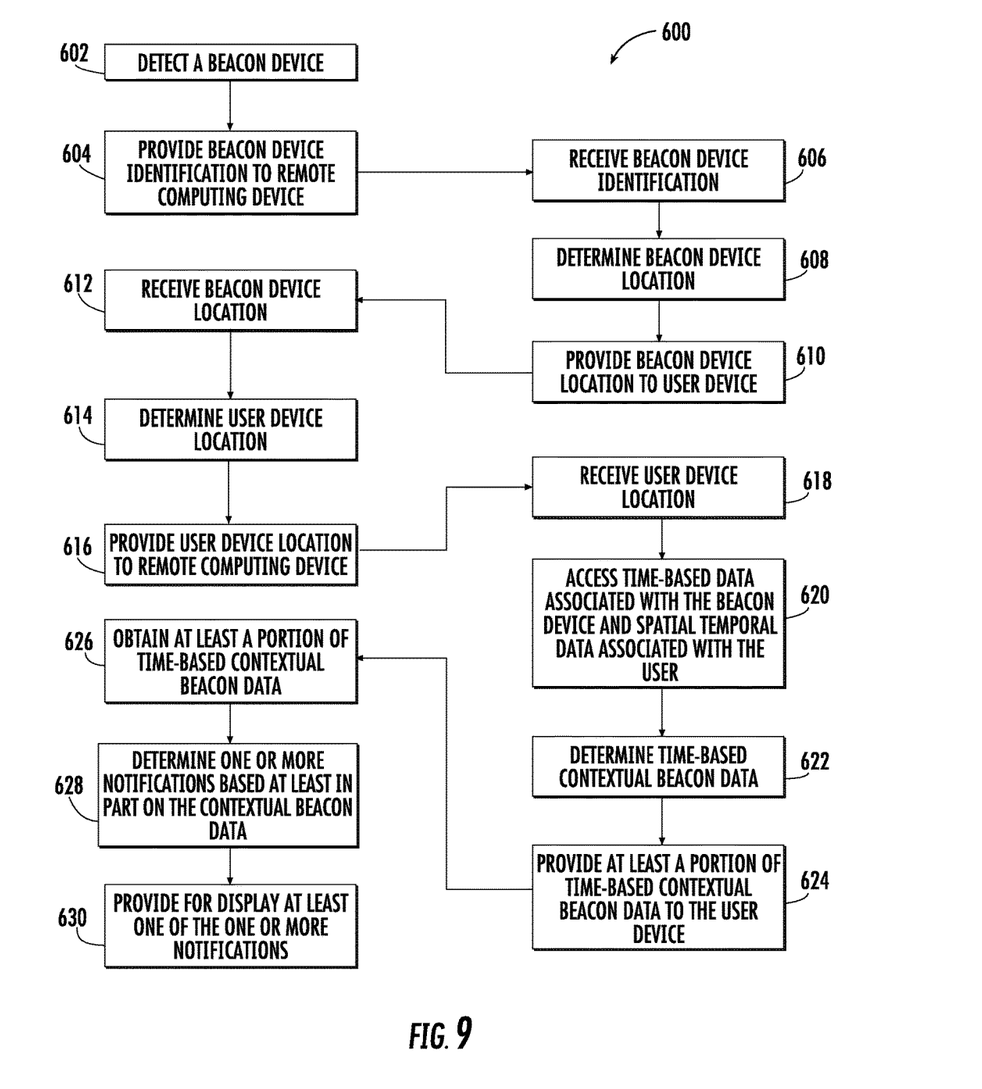
FIG. 9 depicts a flow diagram of an example method of providing notifications according to example embodiments of the present disclosure

In example embodiments, the systems and methods provided herein can be implemented using a client-server architecture. For instance, FIG. 9 depicts a flow diagram of an example method (600) of providing notifications according to example embodiments of the present disclosure. At (602), method (600) can include detecting, by a user device, a beacon device. For instance, detecting a beacon device can include receiving a signal from the beacon device indicative of an identification the beacon device. At (604), the user device can provide the beacon device identification to a remote computing device. At (606) the remote computing device can receive the beacon device identification. At (608) the remote computing device can determine a location of the beacon device based at least in part on the beacon device identification. At (610), the remote computing device can provide the beacon device location to the user device. At (612), the user device can receive the beacon device location.

At (614), the user device can determine a location of the user device based at least in part on the beacon device location. In alternative embodiments, the user device can determine the user device location using other suitable location determination techniques (e.g. GPS, WiFi, cell network, etc.) At (616) the user device can provide the user device location to the remote computing device. At (618), the remote computing device can receive the user device location.

At (620), the remote computing device can access time-based data associated with the beacon device and spatial-temporal data associated with the user. As indicated above, the time-based beacon data can include calendar data associated with the beacon device. The spatial-temporal data can include the location of the user device, and a time (e.g. the current time and/or a user specified time). The spatial-temporal data can further include calendar data associated with a user of the user device. For instance, in example embodiments the spatial-temporal data can be stored using the iCalendar standard (defined in RFC 5545). The spatial-temporal data can be stored in a database associated with the remote computing device or other computing device. In alternative embodiments, at least a portion of the spatial-temporal data can be stored in the user device.

At (622), the remote computing device can determine time-based contextual beacon data based at least in part on the spatial-temporal data. At (624), the remote computing device can provide at least a portion of the contextual beacon data to the user device. At (626), the user device can obtain the at least a portion of contextual beacon data. At (628) the user device can determine one or more notifications based at least in part on the contextual beacon data. At (630), the user device can provide for display at least one of the one or more notifications.

Example Computing System for Providing Beacon-Based Notifications

Figure 10:
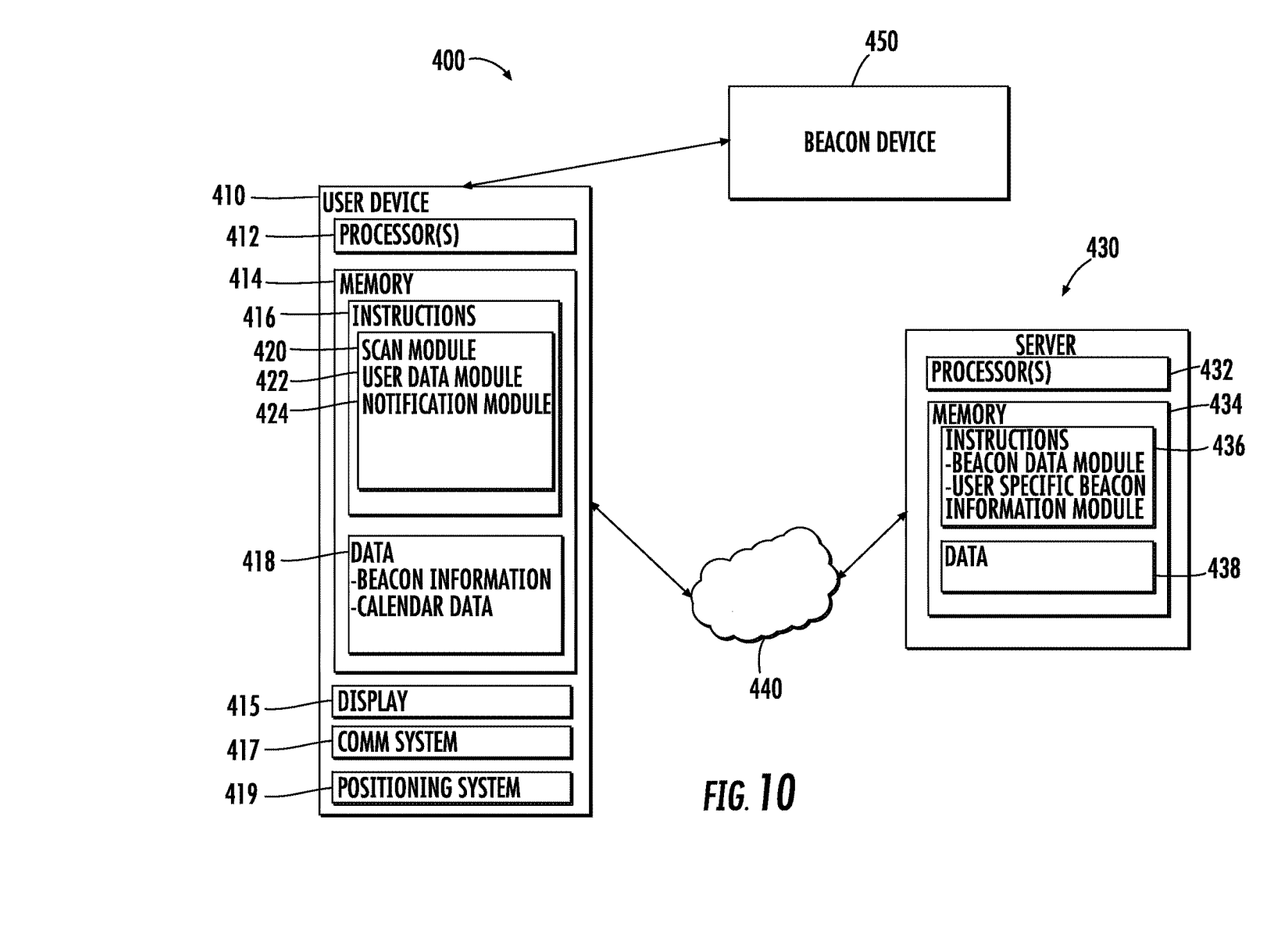
FIG. 10 depicts an example computing system according to example embodiments of the present disclosure.

FIG. 10 depicts an example computing system 400 that can be used to implement the methods and systems providing beacon-based notifications according to example aspects of the present disclosure. System 400 can include a user device 410. User device 410 can be any suitable type of mobile computing device, such as a smartphone, tablet, cellular telephone, wearable computing device, or any other suitable mobile computing device capable of being carried by a user while in operation. User device 410 can include one or more processor(s) 412 and one or more memory devices 414.

The one or more processor(s) 412 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices, such as a system on a chip (SoC) or a SoC with an integrated RF transceiver. The one or more memory devices 414 can include one or more computer-readable media, including, but not limited to, non-transitory computer-readable media, RAM, ROM, hard drives, flash memory, or other memory devices.

The one or more memory devices 414 can store information accessible by the one or more processors 412, including instructions 416 that can be executed by the one or more processors 412. For instance, the memory devices 414 can store instructions 416 for implementing one or more modules configured to implement a scan module 420, a user data module 422, a notification module 424, and/or various aspects of any of the methods disclosed herein. Scan module 420 can be configured to scan for one or more beacon devices. User data module 422 can be configured to determine spatial-temporal data associated with a user. Notification module 424 can be configured to generate and provide for display one or more notifications associated with a beacon device.

The one or more memory devices 414 can also include data 418 that can be retrieved, manipulated, created, or stored by the one or more processors 412. The data can include, for instance, beacon information, calendar data and/or other information.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into one or more memory devices and executed by one or more processors or can be provided from computer program products, for example computer executable instructions, that are stored in a tangible computer-readable storage medium such as RAM, ROM, flash memory, hard disk or optical or magnetic media. In example embodiments, modules can be implemented in hardware independent of the one or more processors. For instance, a module can be implemented using a WiFi and/or Bluetooth transceiver, module or microcontroller. When software is used, any suitable programming language or platform can be used to implement the module.

User device 410 can include various input/output devices for providing and receiving information from a user, such as a touch screen, touch pad, data entry keys, speakers, and/or a microphone suitable for voice recognition. For instance, user device 410 can have a display 415 for presenting a user interface to a user. User device 410 can further include a communication system 417. Communication system 417 can be used to communicate with a beacon device, such as beacon device 450.

User device 410 can further include a positioning system 419. The positioning system 419 can be any device or circuitry for determining the position of remote computing device. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, WiFi time-of-flight, and/or other suitable techniques for determining position.

User device 410 can also include a network interface used to communicate with one or more remote computing devices (e.g. server 430) over a network 440. The network interface can include any suitable components for interfacing with one more networks, including for example, transmitters, receivers, ports, controllers, antennas, or other suitable components.

In some implementations, the user device can be in communication with a remote computing device, such as a server 430 over network 440. Server 430 can be one or more computing devices, such as described above with regard to server 118 in FIG. 1.

Similar to the user device 410, server 430 can include one or more processor(s) 432 and a memory 434. The one or more processor(s) 432 can include one or more central processing units (CPUs), and/or other processing devices. The memory 434 can include one or more computer-readable media and can store information accessible by the one or more processors 432, including instructions 436 that can be executed by the one or more processors 432, and data 438. For instance, the memory 434 can store instructions 436 for implementing a beacon data module for determining time-based contextual beacon data associated with a beacon device.

Server 430 can also include a network interface used to communicate with computing device 410 over network 440. The network interface can include any suitable components for interfacing with one more networks, including for example, transmitters, receivers, ports, controllers, antennas, or other suitable components.

Network 440 can be any type of communications network, such as a local area network (e.g. intranet), wide area network (e.g. Internet), cellular network, or some combination thereof. Network 440 can also include a direct connection between user device 410 and server 430. Network 440 can include any number of wired or wireless links and can be carried out using any suitable communication protocol.

System 400 can further include one or more beacon devices, such as beacon device 450. Beacon device 450 can broadcast messages such as described with regard to beacon devices 102-110 in FIG. 1. Beacon device 450 can be implemented using any suitable computing device(s). Although only one beacon device is depicted in FIG. 10, it will be appreciated by those skilled in the art that any suitable number of beacon devices can be included in system 400.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of providing notifications to a user, the method comprising:
   detecting, by one or more computing devices, a beacon device;
   obtaining, by the one or more computing devices, at least a portion of time-based contextual data associated with the beacon device, wherein the time-based contextual data comprises information associated with one or more time periods for one or more events at a geographic location of the beacon device;
   determining, by the one or more computing devices, a concurrence between at least a portion of the time based-contextual data and user data associated with a user;
   responsive to determining the concurrence, determining, by the one or more computing devices, one or more notifications based at least in part on the time-based contextual data; and
   providing for display, by the one or more computing devices, at least one of the one or more notifications associated with the one or more events for which the corresponding one or more time periods have not expired, wherein providing for display at least one of the one or more notifications further comprises ranking the one or more notifications based at least in part on the geographic location of the beacon device and providing for display the notifications that are above a priority threshold.

2. The computer-implemented method of claim 1, wherein detecting the beacon device comprises receiving an identifying signal from the beacon device.

3. The computer-implemented method of claim 2, further comprising providing, by the one or more computing devices, data indicative of the identifying signal to a remote computing device;
   wherein obtaining at least a portion of time-based contextual data comprises receiving, by the one or more computing devices, the at least a portion of time-based contextual data from the remote computing device.

4. The computer-implemented method of claim 2, further comprising:
   determining, by the one or more computing devices, the geographic location of the beacon device based at least in part on the identifying signal; and
   determining, by the one or more computing devices, a user location based at least in part on the geographic location of the beacon device.

5. The computer implemented method of claim 1, wherein the time-based contextual data comprises calendar data associated with the beacon device.

6. The computer-implemented method of claim 5, wherein the user data comprises calendar data associated with the user.

7. The computer-implemented method of claim 1, wherein the user data comprises spatial temporal data comprising a user location and either a current time or a user specified time.

8. The computer-implemented method of claim 1, further comprising:
   receiving, by the one or more computing devices, a user input associated with the at least one of the one or more notifications; and
   responsive to the user input, performing one or more actions associated with the time-based contextual data.

9. The computer-implemented method of claim 8, wherein the one or more actions comprises providing for display travel directions to a destination determined to be relevant to a user based at least in part on the user data.

10. The computer-implemented method of claim 8, wherein the one or more actions comprises providing for display information associated with the at least a portion of time-based contextual data.

11. The computer-implemented method of claim 1, wherein providing for display at least one of the one or more notifications further comprises ranking the one or more notifications based at least in part on the relevance of the notifications to the user, and providing for display the notifications that are above a priority threshold.

12. The computer-implemented method of claim 11, wherein the ranking is determined based at least in part on at least one of a search history of the user, or a location history of the user.

13. The computer-implemented method of claim 1, wherein providing for display at least one of the one or more notifications further comprises identifying one or more duplicate notifications, and filtering the one or more duplicate notifications such that the one or more duplicate notifications are not provided for display to the user.

14. A computing system comprising:
   one or more processors; and
   one or more memory devices storing computer-readable instructions that when executed by the one or more processors cause the one or more processors to perform operations, the operations comprising:
   detecting a beacon device;
   obtaining at least a portion of time-based contextual data associated with the beacon device, wherein the time-based contextual data comprises information associated with one or more time periods for one or more events at a geographic location of the beacon device;
   determining a concurrence between at least a portion of the time based-contextual data and user data associated with a user;
   responsive to determining the concurrence, determining one or more notifications based at least in part on the time-based contextual data; and
   providing for display at least one of the one or more notifications associated with the one or more events for which the corresponding one or more time periods have not expired, wherein providing for display at least one of the one or more notifications further comprises ranking the one or more notifications based at least in part on the geographic location of the beacon device and providing for display the notifications that are above a priority threshold.

15. The computing system of claim 14, wherein the operations further comprise:
   determining a location of the beacon device based at least in part on the beacon device identification;
   providing the location of the beacon device to the user device; and
   receiving, from the user device, a location of the user device, the location of the user device being determined based at least in part on the location of the beacon device.

16. The computing system of claim 14, wherein the user data comprises a user location and either a current time or a user specified time.

17. One or more non-transitory computer-readable media storing computer-readable instructions that when executed by one or more processors cause the one or more processors to perform operations, the operations comprising:

detecting a beacon device;
obtaining at least a portion of time-based contextual data associated with the beacon device, wherein the time-based contextual data comprises information associated with one or more time periods for one or more events at a geographic location of the beacon device;
determining a concurrence between at least a portion of the time based-contextual data and user data associated with a user;
responsive to determining the concurrence, determining one or more notifications based at least in part on the time-based contextual data; and
providing for display at least one of the one or more notifications associated with the one or more events for which the corresponding one or more time periods have not expired, wherein providing for display at least one of the one or more notifications further comprises ranking the one or more notifications based at least in part on the geographic location of the beacon device and providing for display the notifications that are above a priority threshold.

18. The one or more non-transitory computer-readable media of claim 17, wherein the operations comprise:
receiving user input associated with the at least one of the one or more notifications; and
responsive to the user input, performing one or more actions associated with the time-based contextual data.

* * * * *